United States Patent [19]

Mock et al.

[11] Patent Number: 4,708,492
[45] Date of Patent: Nov. 24, 1987

[54] WATCH CASE ELEMENT AND WRISTLET ASSEMBLY

[75] Inventors: Elmar Mock, Pery; Jean-Marie Hotz, Frinvillier, both of Switzerland

[73] Assignee: ETA SA Fabriques d'Ebauches, Grenchen, Switzerland

[21] Appl. No.: 844,443

[22] Filed: Mar. 26, 1986

[30] Foreign Application Priority Data

Apr. 2, 1985 [FR] France ................................ 85 05107

[51] Int. Cl.⁴ ............................................. G04B 37/00
[52] U.S. Cl. ..................................... 368/282; 368/280; 224/164
[58] Field of Search .............................. 368/282, 280; 224/164–179; 63/3; 24/265

[56] References Cited

U.S. PATENT DOCUMENTS

| 2,207,512 | 7/1940 | Guild | 368/282 |
| 3,545,198 | 12/1970 | Loftus | 368/282 |
| 3,675,414 | 7/1972 | Cachelin | 368/282 |
| 3,962,013 | 6/1976 | Mashida | 156/215 |
| 4,167,850 | 9/1979 | Schnieder | 368/282 |
| 4,178,751 | 12/1979 | Liautaud | 368/282 |
| 4,183,986 | 1/1980 | Blaetterlein | 428/160 |
| 4,417,753 | 11/1983 | Bacehowski et al. | 285/21 |
| 4,462,697 | 7/1984 | Thompson | 368/282 |
| 4,506,992 | 3/1985 | Bonnet | 368/282 |

FOREIGN PATENT DOCUMENTS

| 2165852 | 8/1973 | France . | |
| 518697 | 3/1972 | Switzerland . | |
| 628787 | 3/1982 | Switzerland . | |
| 645498 | 10/1984 | Switzerland | 368/282 |
| 1555848 | 11/1979 | United Kingdom . | |
| 2113975 | 8/1983 | United Kingdom . | |
| 2157462 | 10/1985 | United Kingdom | 368/282 |

Primary Examiner—Bernard Roskoski
Attorney, Agent, or Firm—Pollock, Vande Sande & Priddy

[57] ABSTRACT

The wristlet (3,4) and the watch case element (2) are solid with each and at least an end of the wristlet is made of a first thermoplastic material. A portion of the watch case element surrounds the end of the wristlet and is made of a second thermoplastic material having a melting temperature greater than the first plastic material.

18 Claims, 13 Drawing Figures

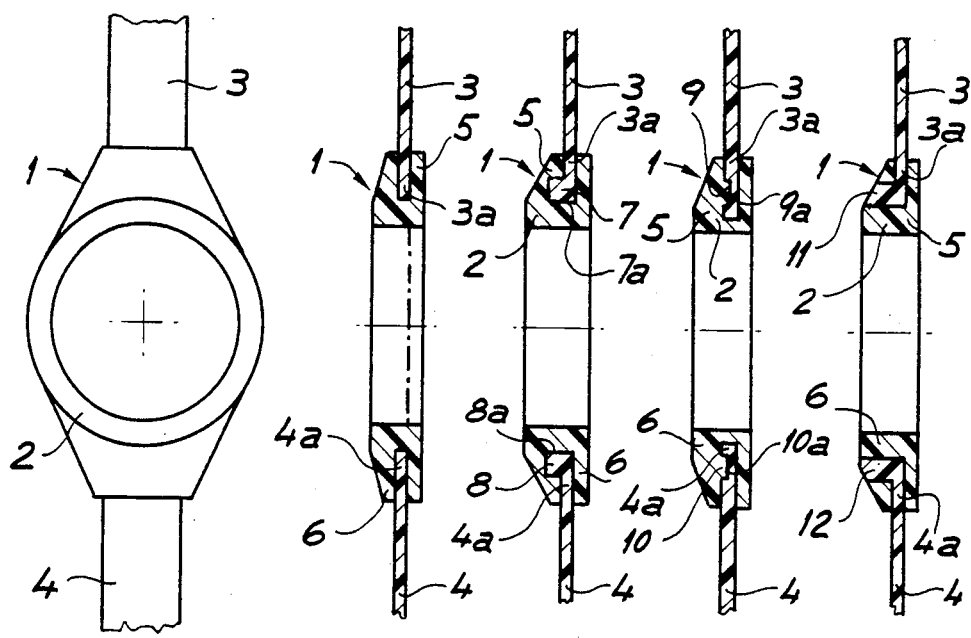
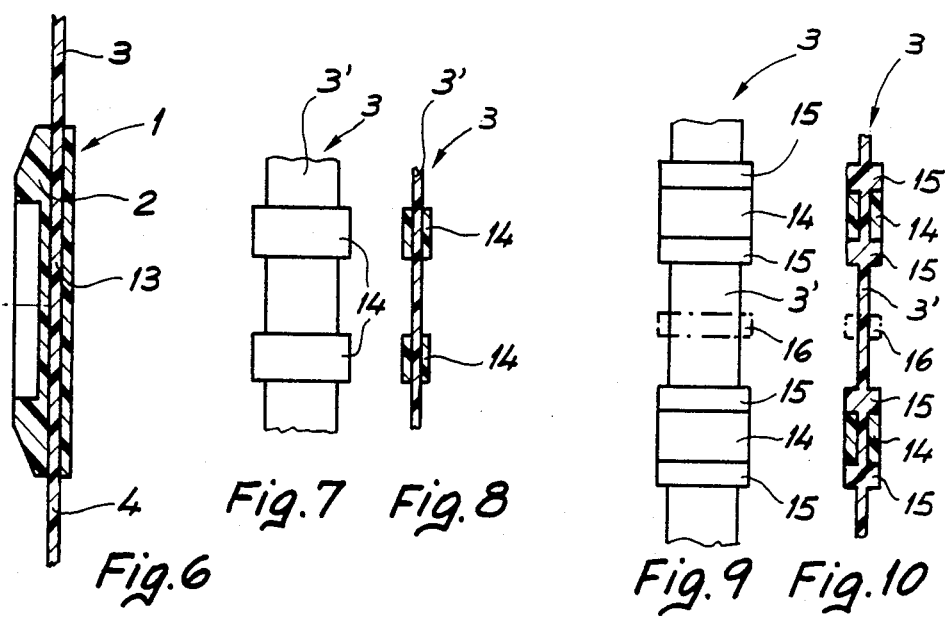
Fig. 1  Fig. 2  Fig. 3  Fig. 4  Fig. 5
Fig. 6  Fig. 7  Fig. 8  Fig. 9  Fig. 10

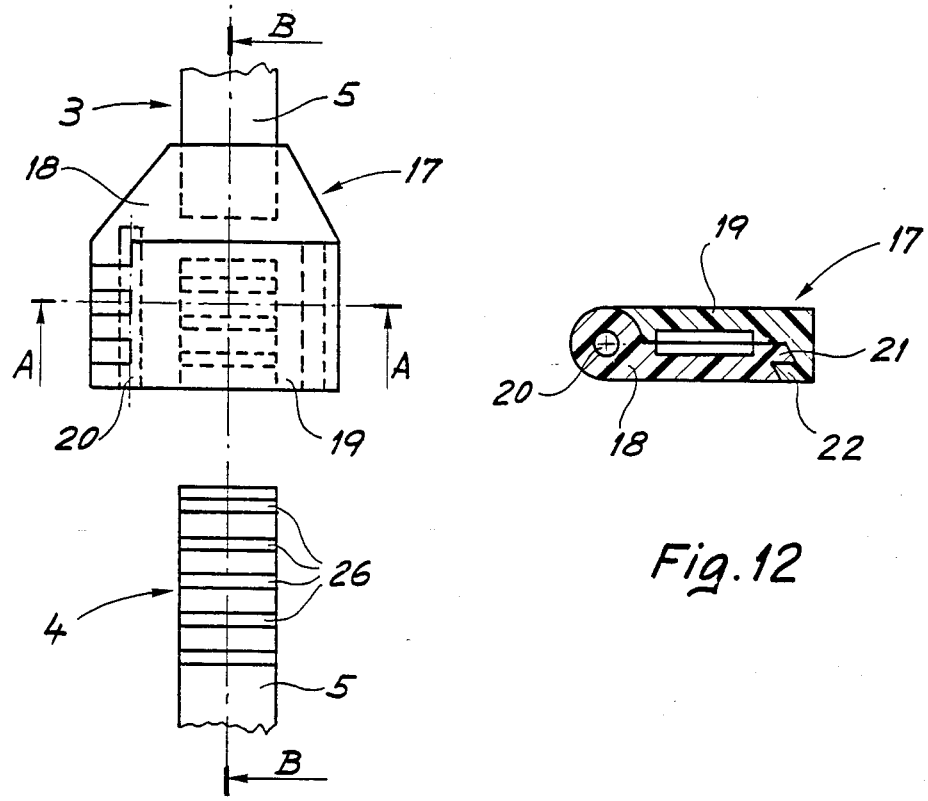
Fig.11
Fig.12
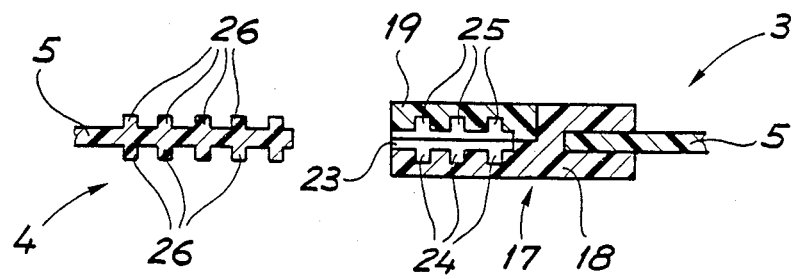
Fig.13

WATCH CASE ELEMENT AND WRISTLET ASSEMBLY

BACKGROUND TO THE INVENTION

This invention relates to an assembly of the kind consisting of a watch case element and of a wristlet comprising at least one band.

SUMMARY OF THE INVENTION

An object of the invention is to provide an assembly of the above set forth kind, which is of pleasing appearance, that can readily be adapted to current fashion trends and which is of low cost price.

To this end said band and said element of the above set forth assembly are respectively made of a first thermoplastic plastic material and of a second thermoplastic plastic material having a melting temperature greater than that of the first plastic material, said element having a portion thereof which surrounds at least one end of said band and which is solid with said end.

BRIEF DESCRIPTION OF THE DRAWINGS

In the accompanying diagrammatic drawings, given by way of example:

FIG. 1 is a plan view of part of an assembly according to the invention;

FIGS. 2 to 6 are side views, in longitudinal section, of part of various forms of construction for the assembly of FIG. 1;

FIGS. 7 and 8 are, respectively, a plan view and a side view in longitudinal section of part of a modified form of wristlet for the assembly of FIGS. 1 to 6;

FIGS. 9 and 10 are, respectively, a plan view and a side view in longitudinal section of part of another modified form of wristlet for the assembly of FIGS. 1 to 6;

FIG. 11 is a plan view of closure means suitable for use with the wristlets of FIGS. 1 to 10; and FIGS. 12 and 13 are respectively sections along lines A—A and B—B of the closure means of FIG. 11.

DETAILED DESCRIPTION

The assembly 1 of FIG. 1 comprises a watch case element 2 and a wristlet having two bands 3 and 4.

Element 2 may simply consist of a case middle. Or it may consist of a case middle together with a back cover. This latter possibility is depicted by the chain dotted line in FIG. 2.

Element 2 has means for fixing thereto the watch movement and the watch glass and, where appropriate, the back cover of the case. These means may be of any kind and will not be described here.

In FIGS. 2 to 5, element 2 comprises two portions 5 and 6 which closely enclose the ends 3a and 4a of bands 3 and 4. Bands 3 and 4 are solid with portions 5 and 6 and cannot be detached therefrom.

Wristlet bands 3 and 4 are made, in a manner that will be described later, of a first thermoplastic plastic material which has the property of being flexible at the usual temperatures of use. Such a material may for instance be a thermoplastic elastomer. Good results have been obtained with a material sold by Atochem of Serquigny in France under the trademark Pebax. Case element 2 is made, in a manner that will also be described later, of a second thermoplastic plastic material which has the property of being solid at the usual temperatures of use and, in addition, has a melting temperature greater than that of the first plastic material. The second plastic material may, for instance, be a polyamide resin of the kind sold by Atochem, referred to above, under the trademark Rilsan.

Assembly 1 may be manufactured in a most simple way. This consists in first injecting the plastic material selected for bands 3 and 4 into an appropriately shaped mould at a temperature equal to or greater than its melting temperature. This injection operation may be performed simultaneously for bands 3 and 4, or separately.

During a second stage, the plastic material selected for case element 2 is moulded over the ends of bands 3 and 4 produced during the first stage. This over moulding operation is achieved by injecting the plastic material into a second mould, suitably shaped to produce case element 2, at a temperature equal to or greater than its melting temperature.

During this latter injection operation, the material forming the ends of bands 3 and 4 is heated to a temperature greater than its melting temperature by the second plastic material as the latter comes into contact therewith, and melts at least superficially.

In the region where the two molten materials are in contact, there is formed a layer consisting of an intimate mixture, or even a kind of alloy, of the two plastic materials.

Once cooled, the layer provides a mechanical bond between bands 3 and 4 and case element 2 which therefore become solid with one another.

In the constructional form shown in FIG. 3, the ends 3a and 4a of bands 3 and 4 that are surrounded by portions 5 and 6 of element 2 are formed with protuberances 7 and 8. Protuberances 7 and 8 engage in recesses 7a and 8a formed in portions 5 and 6 of element 2.

Protuberances 7 and 8 may have any shape, e.g. that of transverse ribs which fully surround bands 3 and 4 or which extend only partly over the periphery of bands 3 and 4. Recesses 7a and 8a formed in case element portions 5 and 6 are shaped in a manner complementary to protuberances 7 and 8.

In the constructional form shown in FIG. 4, case element portions 5 and 6 are provided with protuberances 9 and 10 which engage in recesses 9a and 10a formed in one end of bands 3 and 4.

What has been said above about the shape and the arrangement of protuberances 7 and 8 and of corresponding recesses 7a and 8a shown in FIG. 3 also applies to protuberances 9 and 10 and to recesses 9a and 10a of FIG. 4.

The above described protuberances and recesses serve to reinforce the bond between bands 3 and 4 and case element 2. When such protuberances and recesses are provided, the range of plastic materials that may be used to produce assembly 1 widens as the materials are then no longer expected to adhere to each other as in the FIG. 2 arrangement.

In the constructional form shown in FIG. 5, bands 3 and 4 have protuberances 11 and 12 similar to protuberances 7 and 8 in FIG. 3. Protuberances 11 and 12 have a thickness such that they become visible on at least one of the surfaces of case element 2. The shape of the visible part of protuberances 11 and 12 can be freely selected. The latter may therefore also have an aesthetic effect, in addition to their reinforcing action on the bond between bands 3 and 4 and case element 2.

In the constructional form shown in FIG. 6, bands 3 and 4 are joined by a common portion 13 such as to form only a single member with the latter. Common portion 13 is fully surrounded by the material of case element 2.

The shape of common portion 13 may be freely selected. When case element 2 includes a back cover, as shown in FIG. 6, common portion 13 may for instance be rectilinear and have the same width as bands 3 and 4.

When case element 2 only consists of a case middle, common portion 13 may for example consist of a pair of spaced-apart parts extending through the thickness of the case middle on opposite sides of the opening intended to accommodate the watch movement. This latter arrangement has not been illustrated.

Common portion 13, as shown in FIG. 6, may also have one or more protuberances similar to protuberances 7, 8, 11 or 12 in FIGS. 3 and 5, with case element 2 then being formed with corresponding recesses. Alternatively, case element 2 may have one or more protuberances similar to protuberances 10 in FIG. 4, with common portion 13 being then formed with corresponding recesses. These various possibilities have not been illustrated.

All of the constructional forms that have been described with reference to FIGS. 3 to 6, and other constructional forms that may be envisaged, may be manufactured using much the same process as for the constructional form shown in FIG. 2. The protuberances, such as protuberances 7, 8, 11 or 12, or the recesses, such as recesses 9a and 10a, are obtained by suitably shaping the mould used to receive the first plastic material, and the corresponding recesses or protuberances are automatically produced when injecting the second plastic material.

In the modified form of wristlet shown in FIGS. 7 and 8, band 3 comprises a core portion 3' and decorative annular portions 14 that closely surround the core portion 3' over part of its length. Decorative portions 14 are spaced from one another such that the core portion 3' is visible in the intermediate gaps.

Decorative portions 14 are solid with the core portion 3' of band 3 and cannot therefore move in relation thereto.

Decorative portions 14 may be made of the same material and at the same time as case element 2 by suitably shaping the mould used to receive the second plastic material. Providing band 3 with decorative portions 14 practically does not increase the cost price of assembly 1 and helps to give it a pleasing appearance.

Band 3 may only have a single decorative portion 14 and band 4 may have one or more decorative portions similar to portions 14 above.

Decorative portions 14 may be of any shape and size and may differ from one portion 14 to the next. Additionally, the core portions of bands 3 and 4 may be provided, at those locations where they are surrounded by decorative portions 14, with one or more protuberances similar to protuberances 7, 8, 11 or 12 in FIGS. 3 and 5. Alternatively, decorative portions 14 may each be provided with one or more protuberances similar to protuberances 9 and 10 in FIG. 4. These protuberances engage in corresponding recesses in the decorative portions and core portions of bands 3 and 4. These modified forms of wristlet have not been illustrated.

In the modified form of wristlet shown in FIGS. 9 and 10, the core portion 3' of band 3 is formed with protuberances 15 disposed along the opposite sides of decorative portions 14.

As before, protuberances 15 may be of any shape and may either fully or partly surround the core portion of band 3. Alternatively, protuberances 15 may contact decorative portions 14 only along part of the side surfaces thereof.

Protuberances 15 help to anchor decorative portions 14 to the core portion of band 3 and also to give assembly 1 a pleasing appearance.

Wristlet band 4 may also have protuberances similar to protuberances 15 of FIGS. 9 and 10.

Additionally, band 3 and/or band 4 may have other protuberances disposed between protuberances 15, for only purely aesthetic purposes. One such protuberance is shown in chain-dotted lines at 16 in FIGS. 9 and 10.

The modified forms of wristlet shown in FIGS. 7 to 10 may be combined with any of the constructional forms of assembly shown in FIGS. 1 to 6.

The various components described above, in particular case element 2, may have shapes other than those shown in FIGS. 1 to 8. Also, the whole or a part of the outer surface of bands 3 and 4, of case element 2 and of decorative portions 14 may not be smooth, e.g. rough or grooved.

The wristlets of FIGS. 1 to 10 may be fitted with closure means of any known kind for the purpose of connecting the ends of bands 3 and 4 that are not connected to case element 2.

The use of a known kind of closure means in an assembly according to the invention suffers however from drawbacks: the closure means need to be manufactured separately from the assembly and need to be fitted separately to the wristlet of the assembly. Further, known closure means have an appearance that does not blend in too well with the appearance of the assembly.

The closure means shown in FIGS. 11 to 13 do not suffer from the above drawbacks and may be provided to advantage on any of the wristlets illustrated in FIGS. 1 to 10. To this end, one of the wristlet bands, e.g. 3, is fitted with a clasp 17 designed to cooperate with the end of the other band, e.g. 4, to close the wristlet.

The clasp 17 has a base portion 18 and a flap portion 19. Part of base portion 18 closely fits round and is solid with the end of band 3. Clasp portions 18 and 19 are hingedly connected by a pin 20 to form a kind of hinge assembly.

Clasp portions 18 and 19 have disengageable snapping edges 21 and 22 located opposite pin 20. The actual shape of the snapping edges will not be described in detail and may be fairly freely determined. For the snapping action to be possible, and the subsequent disengagement, one or both of the clasp portions should be sufficiently resilient, at least in the region of edges 21 and 22. This resiliency may be achieved by suitably selecting the material used to produce the relevant clasp portion and the shape of the latter in the region of edges 21 and 22.

When clasp 17 is closed, it defines in its central part a cavity 23 which is open at the end of clasp 17 remote from band 3.

The walls of clasp portions 18 and 19 that define cavity 23 are formed with recesses 24 and 25, respectively, in facing relationship, which in the present instance consist of parallel grooves extending perpendicularly to the lengthwise direction of band 3.

The end of band 4 is formed with protuberances 26 shaped to fit recesses 24 and 25, i.e. parallel ribs in the present case extending perpendicularly to the lengthwise direction of band 4. Protuberances 26 are designed to cooperate with recesses 24 and 25 to retain the end of band 4 in clasp 17 when the latter is closed.

The simple way in which clasp 17 works will be readily apparent from the drawings and the above description without it being necessary to say any more about it.

The end of band 3 that is engaged by flap portion 18 may comprise one or more protuberances similar to protuberances 7, 8, 11 and 12 in FIGS. 3 and 5. Alternatively, the part of clasp 18 that engages the end of band 3 may comprise one or more protuberances similar to protuberances 9 and 10 in FIG. 4. Clasp portion 18 or band 3 are then formed with the corresponding recess(es). These latter two arrangements have not been illustrated.

These protuberances and recesses serve to reinforce the bonding action between clasp 17 and band 3.

Clasp portions 18 and 19 may be produced at the same time as case element 2 and, when provided, as decorative portions 14, using the same material. It suffices to give the moulds being used the required shape.

What has been said about the shape of case element 2 and of decorative portions 14 and the state of their outer surfaces also applies to the other surfaces of clasp 17.

Pin 20 connecting clasp portions 18 and 19 and the parts of the latter with which pin 20 cooperates may be replaced by a thin blade of the same plastic material as clasp portions 18 and 19. This thin blade is made at the same time as portions 18 and 19 and is integral therewith. The thickness of this blade should be sufficiently thin to be flexible and enable relative motion between portions 18 and 19.

The various modifications discussed above for clasp 17 have not been illustrated.

Various modifications may be made to the assembly according to the invention as described and illustrated.

For instance, the aspect may readily be modified by changing the shape of the moulds into which the plastic materials are injected.

Further, the assembly according to the invention is well suited to mass production so that its cost price may be kept quite low.

We claim:

1. An assembly including at least a watch case element and a wristlet comprising at least one band, wherein at least one end of said band is made of a first thermoplastic plastic material and said element is made of a second thermoplastic plastic material having a melting temperature greater than that of the first plastic material, said element having a portion thereof which surrounds said at least one end of said band and is solid with said end to attach said band to said element.

2. An assembly as in claim 1, wherein said element is solid with said band through adherence of said first and second constituent plastic materials.

3. An assembly as in claim 1, wherein said element is formed with a recess and said band has a protuberance on said end which engages in said recess.

4. An assembly as in claim 1, wherein said end is formed with a recess and said element has a protuberance which engages in said recess.

5. An assembly as in claim 1, wherein said band comprises a core portion made of said first plastic material and a decorative portion surrounding said core portion over part of its length, which is solid therewith and which is made of said second plastic material.

6. An assembly as in claim 5, wherein said decorative portion is formed with a recess and said core portion has a protuberance which engages in said recess.

7. An assembly as in claim 5, wherein said core portion is formed with a recess and said decorative element has a protuberance which engages in said recess.

8. An assembly as in claim 1, wherein said wristlet comprises two bands and a common portion connecting said two bands and integral therewith, said common portion being accomodated wholly within the material of said element.

9. An assembly as in claim 1, wherein said wristlet comprises first and second of said bands and a clasp made of said second plastic material and having at least a part thereof surrounding and solid with a free end of said first band made of said first plastic material, said clasp having means for fastening it to a free end of said second band.

10. An assembly as in claim 1, wherein said element is made solid with said band by a layer comprising an intimate mixture of said first and second plastic materials.

11. An assembly comprising at least a watch case element and a wristlet having at least one band, wherein at least one end of said band is made of a first thermoplastic plastic material and said element is made of a second thermoplastic plastic material having a melting temperature greater than that of the first plastic material, a portion of said element being mechanically bonded to said at least one end of said band by a layer comprising an intimate mixture of said first and second plastic materials and said mechanically bonded portion surrounding said at least one end of said band.

12. An assembly as in claim 11, wherein said element is formed with a recess and said band has a protuberance on said end which is received in said recess.

13. An assembly as in claim 11, wherein said end is formed with a recess and said element has a protuberance which is received in said recess.

14. An assembly as in claim 11, wherein said bond comprises a core portion made of said first plastic material and a decorative portion which surrounds said core portion over part of its length, which is solid with part of said core portion, and which is made of said second plastic material.

15. An assembly as in claim 14, wherein said decorative portion is formed with a recess and said core portion has a protuberance which is received in said recess.

16. An assembly as in claim 14, wherein said core portion is formed with a recess and said decorative element has a protuberance which is received in said recess.

17. An assembly as in claim 11, wherein said wristlet comprises two bands and a common portion connecting said two bands and integral therewith, said common portion being accommodated wholly within the material of said element.

18. An assembly as in claim 11, wherein said wristlet comprises first and second of said bands and a clasp made of said second plastic material and having at least a part thereof surrounding and bonded to a free end of said first band by a layer comprising an intimate mixture of said first and second plastic materials, said clasp having means for fastening it to a free end of said second band.

* * * * *